United States Patent
Paukshto

(10) Patent No.: US 7,234,817 B2
(45) Date of Patent: Jun. 26, 2007

(54) LIQUID CRYSTAL PROJECTION SYSTEM

(75) Inventor: Michael V. Paukshto, San Mateo, CA (US)

(73) Assignee: Nitto Denko Corporation, Ibaraki-shi (JP)

(*) Notice: Subject to any disclaimer, the term of this patent is extended or adjusted under 35 U.S.C. 154(b) by 0 days.

(21) Appl. No.: 10/884,843

(22) Filed: Jul. 2, 2004

(65) Prior Publication Data
US 2005/0041213 A1 Feb. 24, 2005

Related U.S. Application Data

(60) Provisional application No. 60/488,487, filed on Jul. 17, 2003.

(51) Int. Cl.
*G03B 21/60* (2006.01)
*G03B 21/56* (2006.01)

(52) U.S. Cl. .................. 353/20; 353/29; 353/122; 359/454

(58) Field of Classification Search ............. 359/443, 359/449, 452, 454–456, 485, 488, 493; 353/20, 353/28, 29, 122
See application file for complete search history.

(56) References Cited

U.S. PATENT DOCUMENTS

| | | | |
|---|---|---|---|
| 2,793,361 A | | 5/1957 | White |
| 3,319,519 A | | 5/1967 | Shelanski |
| 5,251,065 A | * | 10/1993 | Uetsuki .................. 359/454 |
| 5,335,022 A | | 8/1994 | Braun et al. |
| 5,444,570 A | | 8/1995 | Uetsuki et al. |
| 5,760,954 A | | 6/1998 | Tatsuki et al. |
| 6,239,907 B1 | | 5/2001 | Allen et al. |
| 6,282,023 B1 | * | 8/2001 | Bergman .................. 359/449 |
| 6,381,068 B1 | * | 4/2002 | Harada et al. ............. 359/443 |
| 6,400,505 B1 | | 6/2002 | Funazaki et al. |
| 6,449,089 B1 | | 9/2002 | Moshrefzadeh et al. |
| 6,462,870 B2 | | 10/2002 | Funazaki et al. |
| 2002/0012165 A1 | | 1/2002 | Funazaki et al. |

(Continued)

FOREIGN PATENT DOCUMENTS

EP  0 295 913 A2  12/1988

(Continued)

OTHER PUBLICATIONS

Bobrov, Y., et al., "Thin Film Polarizers For Liquid Crystal Displays", Proceedings of SPIE, vol. 4511, SPIE 0277-786X/01, 2001, pp. 133-140.

(Continued)

*Primary Examiner*—W. B. Perkey
*Assistant Examiner*—Andrew Sever
(74) *Attorney, Agent, or Firm*—Westerman, Hattori, Daniels & Adrian, LLP.

(57) ABSTRACT

A projection system is provided. The projection system comprises a projector for producing a polarized light for projecting an image and a projection screen on which the image projected by the projector is visualized. The polarization plane of the polarized light and the polarization plane of the polarizing means are parallel. The polarizing means comprises a film formed by rodlike supramolecules including at least one polycyclic organic compound with conjugated $\pi$-systems, whereby the 40% viewing angle transmittance iso-line of the polarizing means of the screen has an aspect ratio of not less than 2.

41 Claims, 12 Drawing Sheets

U.S. PATENT DOCUMENTS

| | | |
|---|---|---|
| 2003/0117704 A1* | 6/2003 | Lippey et al. .............. 359/443 |
| 2003/0154909 A1 | 8/2003 | Lazarev et al. |
| 2003/0223113 A1* | 12/2003 | Starkweather .............. 359/451 |
| 2003/0227597 A1 | 12/2003 | Silverstein et al. |
| 2004/0067324 A1 | 4/2004 | Lazarev et al. |
| 2004/0080825 A1* | 4/2004 | Harita et al. ................ 359/490 |

FOREIGN PATENT DOCUMENTS

| | | |
|---|---|---|
| EP | 0 905 556 A2 | 3/1999 |
| EP | 1 128 192 A1 | 8/2001 |
| JP | 3089316 A | 4/1991 |
| RU | 2 137 801 C1 * | 9/1999 |
| WO | WO 99/53376 A2 | 10/1999 |
| WO | WO 01/63346 A1 | 8/2001 |
| WO | WO 03/007025 A2 | 1/2003 |

OTHER PUBLICATIONS

Ebina, Kazuyoshi, "*51.3: Optical System Architectures for Rear Projection Screen*", SID 02 Digest, 2002, pp. 1342-1345.

Lazarev, P., et al., "*Thin Crystal Film Retarders*", Proceedings of the 7th International Workshop "Displays, Materials and Components", Kobe, Japan, Nov. 29-Dec. 1, 2000, pp. 1159-1160.

Nagata, Yoshihide, et al., "*20.3: An Advanced Projection Screen with a Wide Vertical View Angle*", SID 04 Digest, 2004, pp. 846-849.

Shimizu, Yuichiro, et al., "*22.4: A Fine-pitch Screen for Rear Projection TV*", SID 03 Digest, 2003, pp. 886-889.

Umeya, Masanori, et al., "*20.2: New Front-Projection Screen Comprised of Cholesteric-LC Films*", SID 04 Digest, 2004, pp. 842-845.

Cobb, C., et al., "*LCD With 7-Micron Light Management Path*", Liquid Crystal Materials, Devices, and Applications VIII, Proceedings of SPIE, 2002 SPIE, vol. 4658, pp. 34-39. XP-002302040.

Paukshto, Michael, et al., "*Two Novel Applications of Thin-Film E-Type Polarizers*", SID 02 Digest, 2002, pp. 722-725 XP-002302039.

Yeh, P., et al., "*Molecular Crystalline Thin Film E-Polarizer*", Molecular Materials, 2001, vol. 14, pp. 1-19 XP-002302038.

* cited by examiner

LIQUID CRYSTAL PROJECTION SYSTEM

RELATED APPLICATION

This application claims priority to the U.S. Provisional Patent Application No. 60/488,487, filed Jul. 17, 2003, the disclosure of which is hereby incorporated by reference in its entirety.

FIELD OF THE INVENTION

This invention relates generally to the field of projection systems. More specifically, the present invention is related to projection screen assemblies and digital projection systems employing liquid crystal displays for image formation.

BACKGROUND OF THE INVENTION

Modern home TV appliances, movie theaters, and presentation apparatuses often use digital projection systems for the purposes of video or static image demonstration. The conventional projection system comprises a projector and a projection screen. One of the most promising solutions for digital projection employs a liquid crystal display (LCD) as the image-forming device. The LCD forms an image as an array of pixels by selectively modulating the polarization state of incident light for each pixel. High-resolution large-area LCDs can be fabricated more readily than the analogous devices of other types. In addition, small thickness and low weight define the general portability and mobility of projection systems. The LCD-based projection systems are often simpler in manufacturing and practical use, especially when large-area image or video demonstration is required.

Conventional projection screens typically include fine transparent or translucent porous particles embedded in a transparent medium and a reflective material located behind the particles. The projection screens reflect substantially all the incident light, that is, they reflect ambient light as well as light from the imaging source. Since a part of the ambient light is reflected toward the viewers, the image contrast and the apparent brightness of the image is often reduced, particularly in areas where the ambient light intensity is relatively high.

To enhance the brightness of the reflected image, some projection screens include retroreflective elements such as glass beads, which are capable of reflecting the ambient light back in the direction from which it was incident onto the screen. The introduction of retroreflective elements, however, narrows the range of angles over which the image can be viewed because the imaging light is also retroreflected. Moreover, if the source of ambient light is aligned with the viewers, the ambient light can also be retroreflected toward the viewers along with the imaging light.

The brightness of images produced by liquid crystal projectors, in particular, can be relatively low because light of only one polarization state is projected onto the screen due to the nature of a liquid crystal display used to form the image. If the projection screen reflects ambient light at a low brightness of the projected, the image contrast can be significantly reduced. As a result, liquid crystal projectors are used primarily in areas with low levels of ambient light, such as rooms in which the windows are shuttered with curtains and in which artificial lighting is dimmed, to limit the contrast reducing effects of the ambient light. This may be undesirable, however, because it hinders the ability of viewers in the room to consult written materials, take notes, etc. during presentations.

Attempts to solve the brightness and contrast problems associated with liquid crystal projectors have included the use of absorbing polarizers in combination with reflective materials. By incorporating absorbing polarizers in the screens, about one-half of the ambient light can be absorbed in the projection screen rather than reflected as in conventional screens that do not use absorptive polarizing materials.

The absorptive polarizing materials used in the projection screens provide for the preferential transmission of light with the first polarization state and block the light with the second polarization state. The transmitted light is then reflected back from the reflective material and retransmitted through the absorptive polarizing material. Therefore, the liquid crystal projectors use light of only one polarization state to form images—that preferentially reflected by the projection screen. Ambient light, however, typically includes light having both polarization states and, therefore, a significant portion of the ambient light incident on the projection screen is absorbed rather than reflected. As a result, the contrast and apparent brightness of the images formed by the liquid crystal projectors on projection screens employing absorptive polarizing materials can be improved as compared to conventional projection screens reflecting light of both polarization states.

While the ideal absorptive polarizing material transmits all incident light having the first polarization state and absorb all incident light in the second polarization state, real absorptive polarizing materials absorb at least some of the incident light having the first polarization state along with the light in the second polarization state. As a result, some of the imaging light is absorbed rather than reflected, thereby reducing image contrast and brightness. Moreover, in projection screens using absorptive polarizing materials, this material is located in front of the reflector. In this arrangement, the incident imaging light having the preferentially transmitted first polarization state must pass through the absorptive material two times before reaching the viewer. In each passage, the absorptive polarizing material can absorb a significant portion of the light with the first polarization state, thereby reducing image brightness.

Besides the above problems, projection screens with absorbing polarizers that include other elements such as diffusing materials may also suffer from reduced image brightness and/or contrast if those additional elements cause some of the image light to change polarization states. A portion of the imaging light whose polarization changes to the state absorbed by the absorptive polarizing material will not reach the viewer. The result is reduced image brightness and contrast.

Projection systems usually require a large viewing angle characteristic of the projections screen. This requirement is especially desirable for the projections screens working in large rooms or in the outdoor environment. For the convenience of the projection screen viewers, the greater viewing angle is especially important in the horizontal plane.

The common drawback of the conventional polarizing projection screens made of iodine-containing organic polarizers is a small viewing angle. This drawback is due to a rodlike shape of molecules of the iodine-containing organic polarizers. The light polarized along a single direction coinciding with the axis of rod-shaped molecules is absorbed. Any deviation of the light polarization from said direction leads to a sharp decrease of the polarized light absorption.

SUMMARY OF THE INVENTION

The present invention provides a projection screen capable of projecting an image with enhanced contrast and a wide viewing angle in the presence of relatively high levels of ambient light, and a projection system using this screen. The disclosed projection screens provide for the desired combination of effects by using a polarizing means formed on the screen, which is based on a film formed by rodlike supramolecules including at least one polycyclic organic compound with conjugated π-systems, whereby the 40% viewing angle transmittance iso-line of the polarizing means has an aspect ratio of not less than 2.

BRIEF DESCRIPTION OF THE DRAWINGS

These drawings are intended for illustration of the concepts and principles of the invention. The invention may be better understood by reference to the description taken in conjunction with the accompanying drawings, in which.

DETAILED DESCRIPTION OF THE INVENTION

Figure 1:
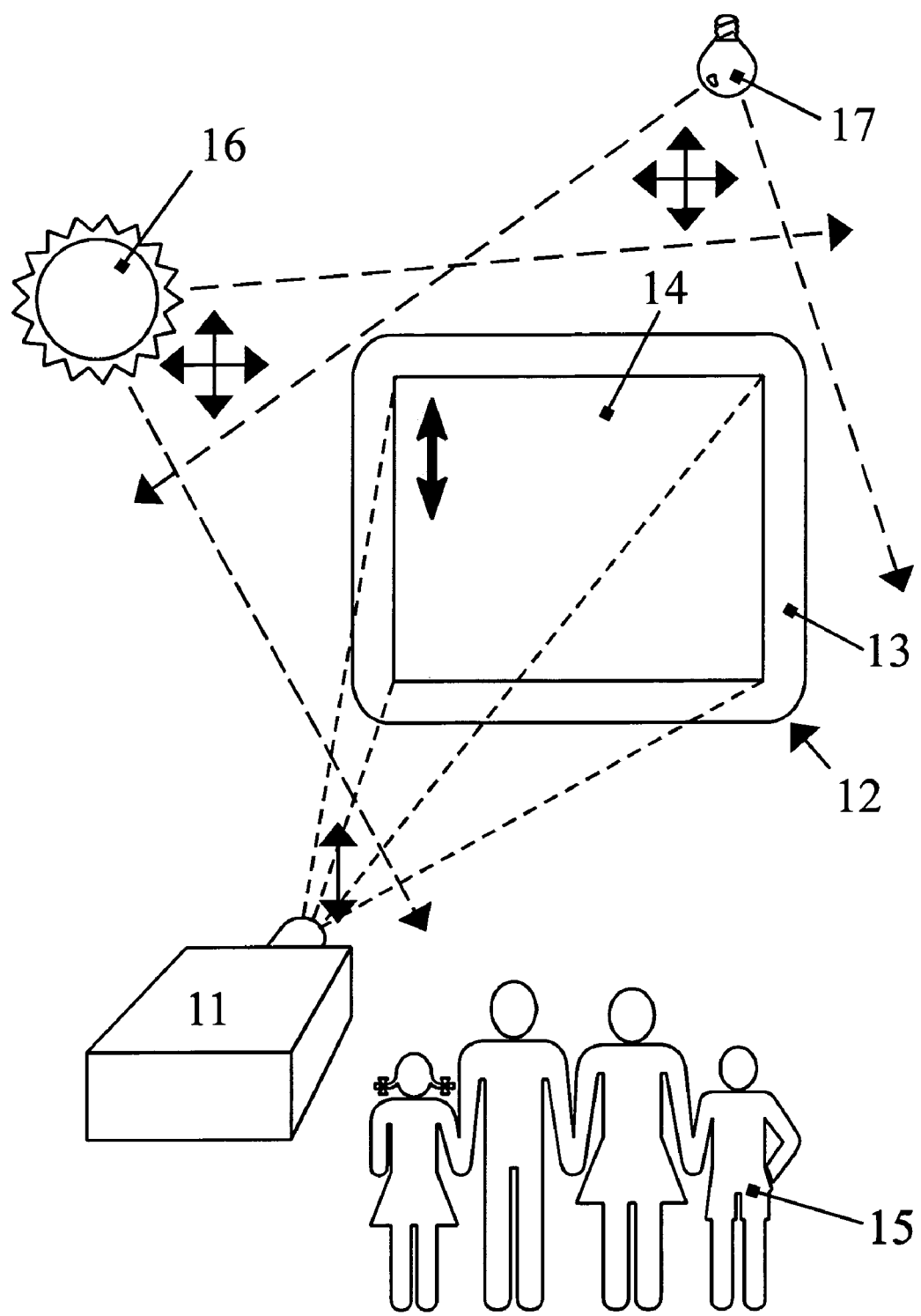
FIG. 1 is a schematic diagram of a projection system.

A conventional projection system of a light-reflecting type is schematically shown in FIG. 1, which includes a digital projection device 11 and projection screen 12. The projection screen 12 comprises a sheet material 13 and reflection sheet 14 covering the surface of the sheet material. An image projected by projector 11 onto screen 12 is reflected by reflection sheet 14 so that viewers 15 can see the image.

The above described conventional projection system can produce a picture of high contrast on screen 12 when no ambient light is incident onto the screen as in a dark room. However, when it is lighting in the room, either from ambient light sources 16 and/or room lamps 17, the contrast of the picture on screen 12 significantly degrades. When the projection device 11 has a color display function, the influence of the ambient light is especially prominent for R (red), G (green) and B (blue) colors of the image.

An increase in the contrast and the viewing angle can be provided by applying special polarizing means onto the screen and by a special mutual orientation of the projection screen and the projector in the projection system.

Figure 2:
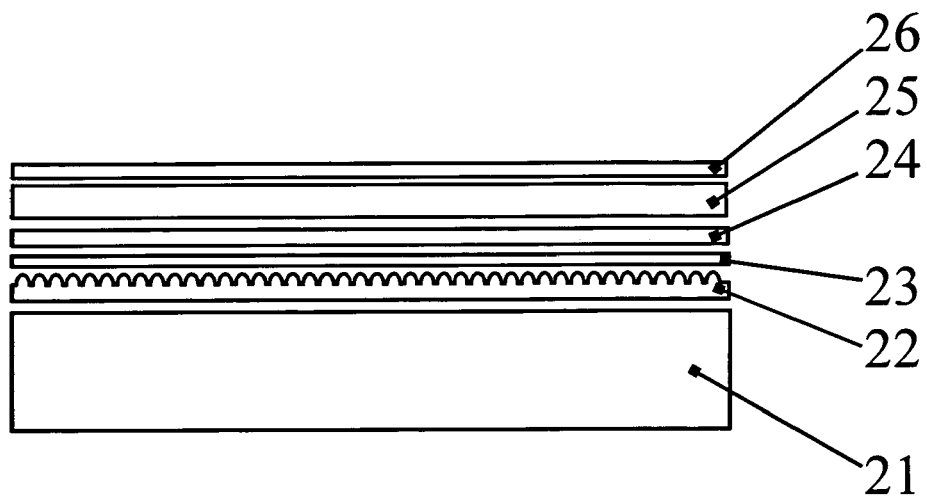
FIG. 2 is a cross-sectional diagram of a front projection screen according to one embodiment of the present invention.

One embodiment of the present invention is presented in FIG. 2. The projection screen comprises substrate 21 (a polymer film), diffusive reflective layer 22, planarization layer 23, and polarizing means 24. The polarizing means 24 is based on a film formed by rodlike supramolecules including at least one polycyclic organic compound with conjugated π-systems, whereby the viewing angle transmittance iso-line of the polarizing means has an aspect ratio of not less than 2. In one embodiment, the projection screen further comprises a protective layer 25 placed onto film 24 and an antiglare (or antireflective) coating 26. In other embodiments, the projection screen comprises other additional functional layers and elements.

The rodlike supramolecules are aligned along the transmission axis of the polarizing means. A condition of the formation of supramolecules is the presence of a developed system of π-conjugated bonds between conjugated aromatic rings of the molecules and the presence of groups (such as amine, phenol, ketone, etc.) lying in the plane of the molecules and involved into the aromatic system of bonds. The molecules and/or their molecular fragments possess a planar structure and are capable of forming supramolecules in solution. Another condition is the maximum overlap of π-orbitals in the stacks of supramolecules. Raw materials for manufacturing the polarizing means are selected taking into account spectral characteristics of these substances. Such films which are also named thin crystal films (TCFs), usually possess a crystal structure with a typical interplanar distance of 3.4±0.3 Å along the transmission axis.

Aromatic polycyclic compounds suitable for obtaining TCFs are characterized by the general formula {R} {F}n, where R is a polycyclic fragment featuring π electron system, F is a modifying functional group ensuring solubility of a given compound in nonpolar or polar solvents (comprising aqueous media), and n is the number of functional groups.

The TCFs can be obtained by a method called Cascade Crystallization Process developed by Optiva, Inc. [P. Lazarev and M. Paukshto, *Proceedings of the 7th International Workshop "Displays, Materials and Components"* (Kobe, Japan, Nov. 29–Dec. 1, 2000), pp. 1159–1160]. WO 03/007025, U.S. 2003-154909) and U.S. 2004-067324 describe a Cascade Crystallization Process, the disclosures of which are hereby incorporated by reference in their entirety. According to this method, such an organic compound dissolved in an appropriate solvent forms a colloidal system (lyotropic liquid crystal solution) in which molecules are aggregated into supramolecules constituting kinetic units of the system. This liquid crystal phase is essentially a precursor of the ordered state of the system, from which a solid anisotropic crystal film also called thin crystal film or TCF is formed in the course of subsequent alignment of the supramolecules and removal of the solvent.

In the resulting anisotropic TCF, the molecular planes are parallel to each other and the molecules form a three-dimensional crystal structure, at least in part of the layer. Optimization of the production technology may allow the formation of a single-crystal film.

The TCF thickness usually does not exceed approximately 1 μm. The film thickness can be controlled by changing the content of a solid substance in the applied solution and by varying the applied layer thickness.

The raw materials for manufacturing suitable TCFs are chosen so that the polarizing means possesses mainly a neutral color and the 40% viewing angle transmittance iso-line of this polarizing means has an aspect ratio not less than 2.

It is possible to use various mixed colloidal systems in which case such mixtures can form joint supramolecules. The mixing of said organic compounds in solutions results in the formation of mixed aggregates of variable composition. The analysis of X-ray diffraction patterns for dye mixtures allows one to judge about the molecular packing in supramolecules by the presence of a characteristic diffraction peak corresponding to the interplanar spacing in the range from 3.1 to 3.7 Å.

The polarizing means described above can be used in the projection screen of any type, namely a front projection screen (a reflection type screen), a rear projection screen (a transmission type screen), and a semitransmissive projection screen.

In one embodiment, the polarizing means transmits more than 80% of the polarized light in the polarization plane. In another embodiment, the polarizing means transmits more than 90% of the polarized light in the polarization plane. In one embodiment, the polarizing means has a dichroic ratio greater than 20.

Figure 3:
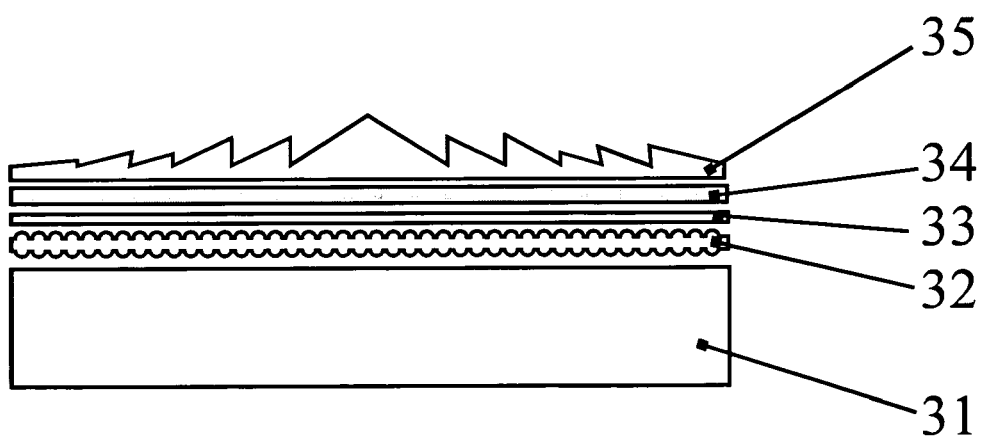
FIG. 3 is a cross-sectional diagram of a rear projection screen according to one embodiment of the present invention.

In one embodiment, the projection screen according to the present invention comprises different additional layers and elements. For example, a rear projection screen illustrated in FIG. 3 further comprises a one-side Fresnel layer 35. FIG. 3 presents one embodiment of the projection screen with the one-side Fresnel layer and as an exemplary embodiment the presented design comprises substrate 31 (a polymer film), diffuse scattering layer 32, planarization layer 33, and polarizing means 34 based on a film formed by rodlike supramolecules including at least one polycyclic organic compound with conjugated π-systems, whereby the viewing angle transmittance iso-line of this polarizing means has an aspect ratio of not less than 2. This projection system exhibits increased stability and compensates or eliminates ghosting.

The one-side Fresnel layer can comprise a matrix and a plurality of particles embedded in the matrix, wherein these particles have a refractive index different from that of the matrix, with a Fresnel structure on one side of the Fresnel layer.

Figure 4:
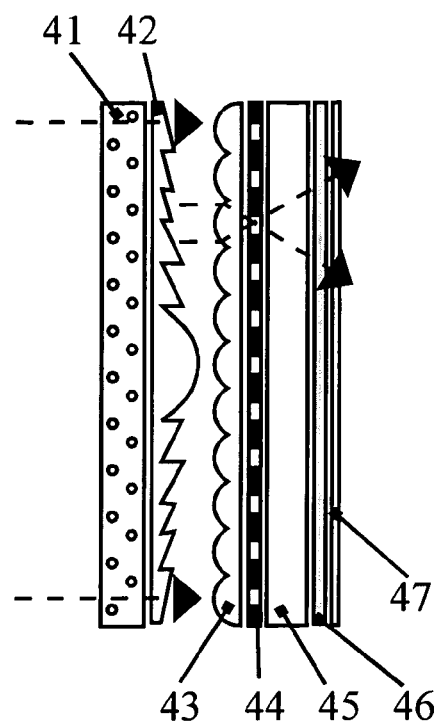
FIG. 4 is a cross-sectional diagram of a rear projection screen with a lenticular lens sheet according to one embodiment of the present invention.

In one embodiment, the rear projection screen can comprise a lenticular lens sheet. The rear projection screen in the exemplary embodiment presented in FIG. 4 consists of a Fresnel lens 42, a substrate 41 (a polymer film comprising scattering particles), a lenticular lens sheet 43, a black stripe 44, which is a film consisting of alternate transparence and absorption fields, planarization layer 45, a polarizing means 46 based on a film formed by rodlike supramolecules including at least one polycyclic organic compound with conjugated π-systems, and a protection layer 47.

Figure 5:
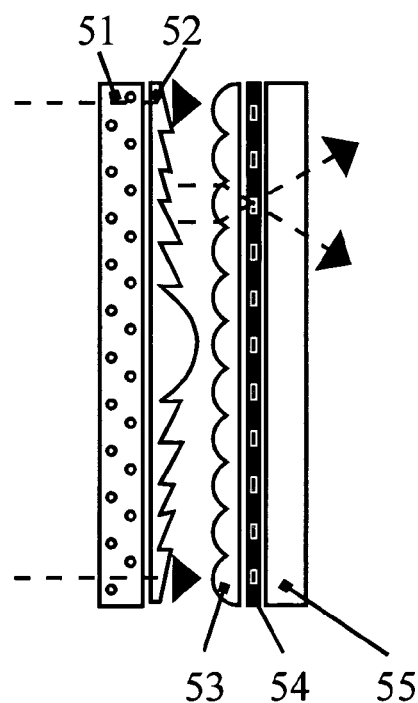
FIG. 5 is a cross-sectional diagram of a rear projection screen with a black stripe manufactured from a polarizing material formed by rodlike supramolecules according to one embodiment of the present invention.

The scattered ambient light and multiple reflected lights in the system can be cut off by black stripe (BS). Preferably the black stripe is manufactured from polarizing material formed by rodlike supramolecules including at least one polycyclic organic compound with conjugated π-systems, as shown in FIG. 5. In this case the transparent fields of the black stripe work as the polarizing means, and the absorption fields of the black stripe cut off light noise. The exemplary rear projection screen consists of a Fresnel lens 52, a substrate 51, a lenticular lens sheet 53, a black stripe 54 comprising anisotropic material formed by rodlike supramolecules including at least one polycyclic organic compound with conjugated π-systems, and a protection layer 55.

Figure 6:
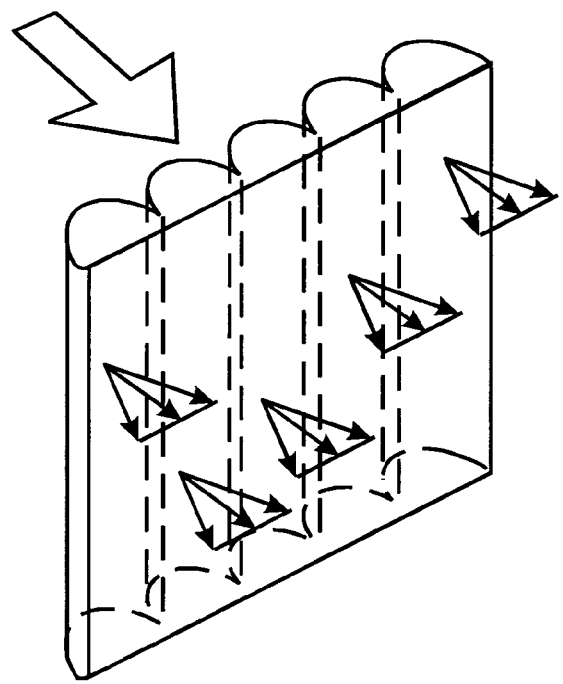
FIG. 6 illustrates ray flux passed through a lenticular lens sheet according to one embodiment of the present invention.

FIG. 6 is an oblique perspective view of the lenticular sheet showing ray flux. The rays, which passed through the lenticular lens, are converged and diverged horizontally. This diverged angle corresponds to scattering angle, and work as view angle.

Figure 7:
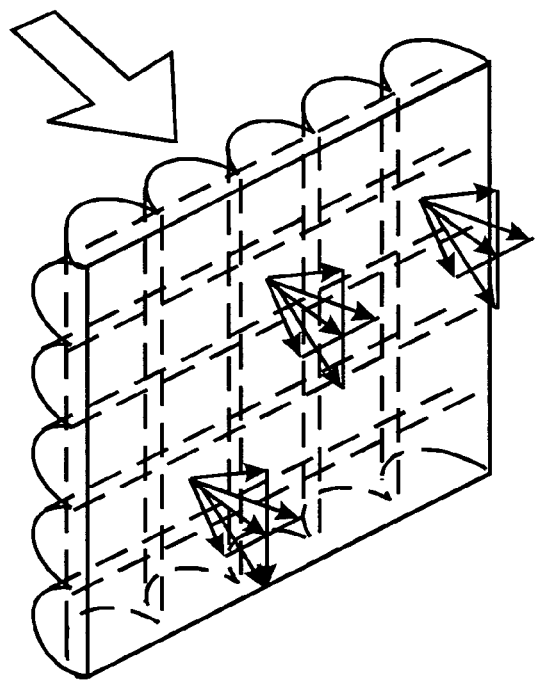
FIG. 7 illustrates ray flux passed through a cross-lenticular lens sheet according to one embodiment of the present invention.

The rear projection screen comprising the lenticular lens sheet and the Fresnel lens shows wide horizontal view angle, fine pitch and high contrast. However, vertical view angle rear projection screen is relatively narrow as well as conventional screen. The simple arrangement to expand vertical view angle is a cross-lenticular lens sheet which is schematically shown in FIG. 7, in which two lenticular lens sheets are combined in rectangle arrangement on one sheet. Using cross-lenticular lens of one sheet permits to get arbitrary direction of the ray flux under control by optical design. The cross-lenticular lens sheet can be used in any construction described above.

Figure 8:
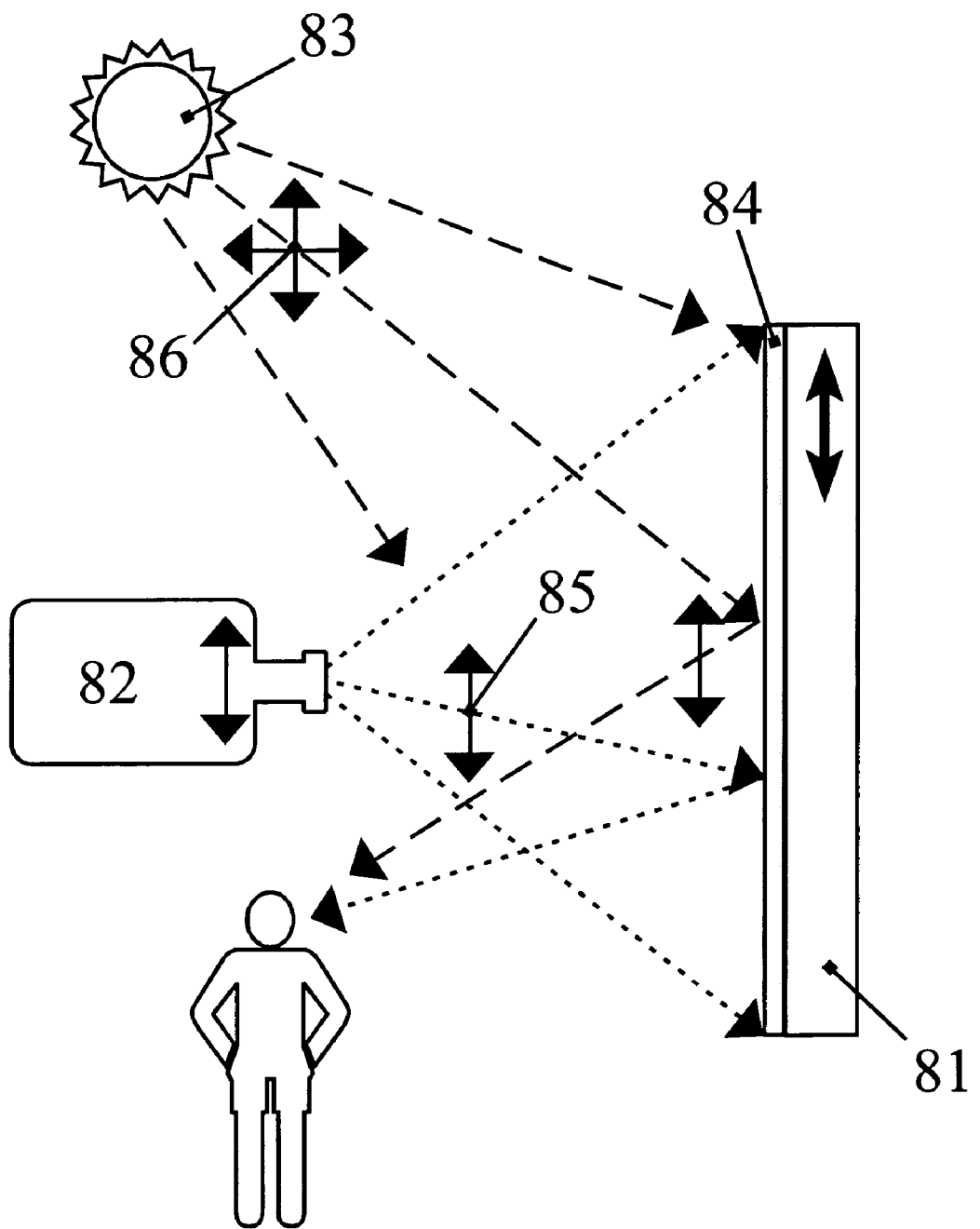
FIG. 8 illustrates a projection system with a front projection screen according to one embodiment of the present invention.

FIG. 8 illustrates a projection system using a front (reflection type) projection screen 81 in combination with image projector 82. Also shown in FIG. 8 is a source 83 of ambient light. The front projection screen 81 includes a polarizing means 84 and other functional layers which are not depicted in this figure. The polarizing means 84 preferentially transmits light having one (first) polarization state 85 and absorbs light having a different (second) polarization state. The projector 82 is capable of projecting polarized light toward screen 81 to form a reflected image thereon. Although any LCD image projector produces images using light of one polarization state, an additional polarizing means can be used for projectors of other types.

The polarized light 85 produced with projector 82 is reflected from the projection screen 81.

Ambient light 86 from light source 83 depicted in FIG. 8 is also incident on projection screen 81 in addition to light 85 from projector 82. The ambient light source 83 can be the sun, in which case ambient light 86 does not have a particular polarization state and is randomly polarized. Therefore, the front projection screen 81 reflects light of the first polarization state (about half of the ambient light intensity) and absorbs light having the second polarization state.

Figure 9:
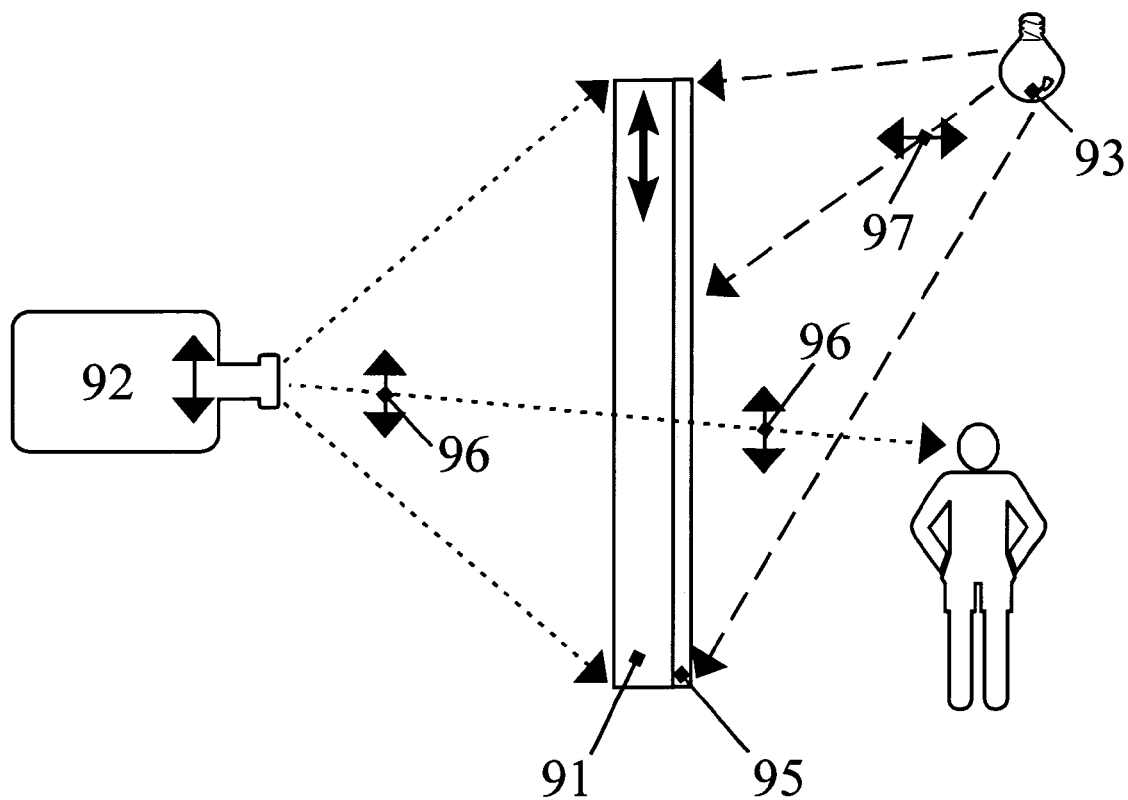
FIG. 9 illustrates a projection system with a rear projection screen according to one embodiment of the present invention.

FIG. 9 illustrates a projection system using a rear (transmission type) projection screen 91 in combination with image projector 92. A source 93 of ambient light is situated on the same side of projection screen 91 from which viewers observe the screen. The rear projection screen 91 includes a polarizing means 95. The polarizing means 95 preferentially transmits light that has one (first) polarizing state 96 and absorbs light having a different (second) polarization state. Preferably, the ambient light source 93 emits light 97 having the second polarization state, which is perpendicular to the transmission axis of the polarizing means 95. The projector 92 is capable of projecting polarized light toward screen 91 to form a transmitted image thereon. Polarized ambient light 97 from light source 93, being incident on the projection screen 91, absorbs fully in the polarizing means 95. The image does not exhibit any flashes.

The projection system according to the present invention can be used for producing stereo images and other special optical effects. The principles of functioning of the systems are illustrated in FIGS. 10 and 11.

Figure 10:
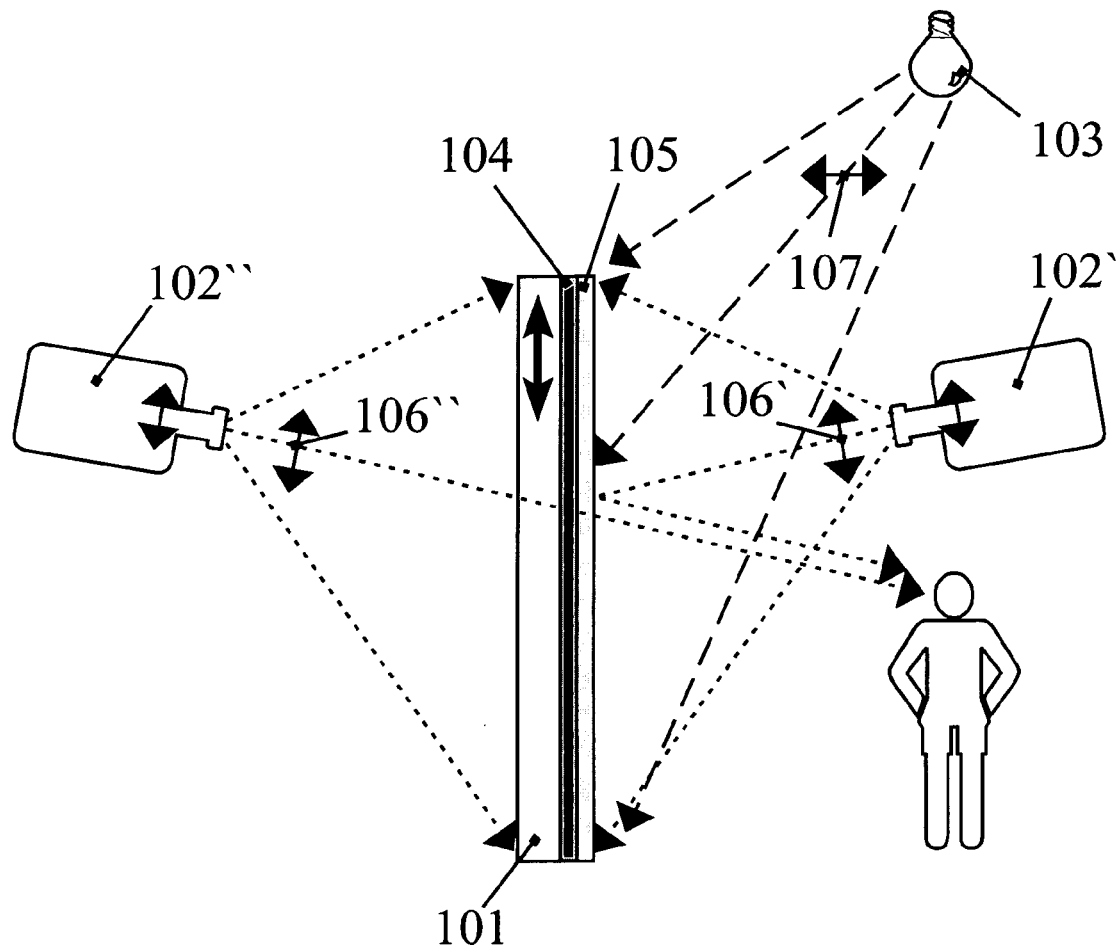
FIG. 10 illustrates a stereo projection system with a semitransmissive projection screen according to one embodiment of the present invention.

The projection system illustrated in FIG. 10 comprises projection screen 101 and two projectors: 102' and 102". The projection screen 101 includes a polarizing means 105 and a semitransmissive layer 104. The image is created by both projectors 102' and 102", which emit light 106' and 106", respectively, having the identical polarization state. The projection screen 101 and projector 102' are functioning as the front projection system. The projection screen 101 and projector 102" are functioning as the rear projection system. Each one or both projectors 102' and 102" may create images discriminated with respect to color, intensity, etc.

Also illustrated in FIG. 10 is a source 103 of ambient light situated on the same side of the projection screen 101 as the projector 102'. Preferably, the ambient light source 103 emits light 107 having the second polarization state, which is perpendicular to the transmission axis of the polarizing means 105.

Figure 11:
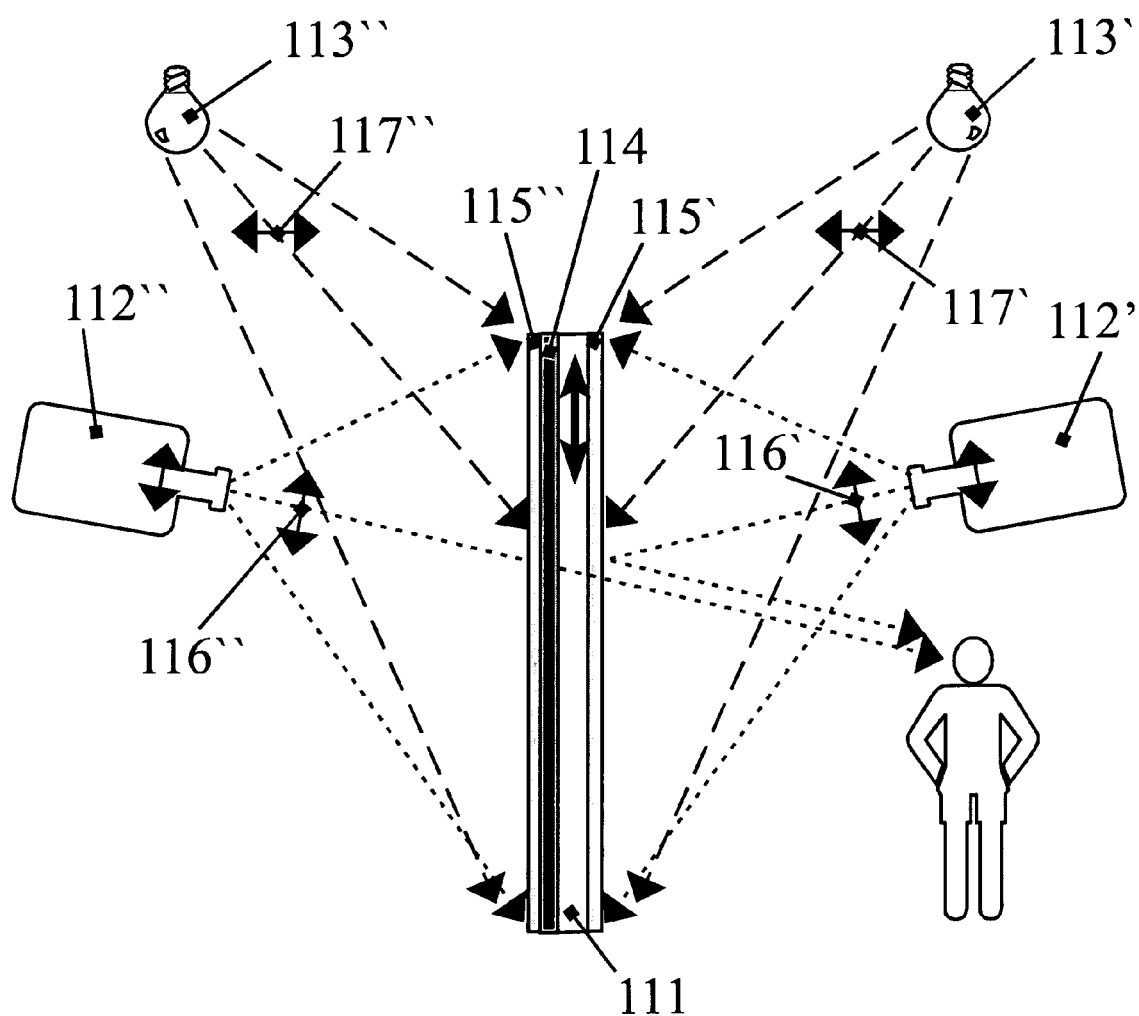
FIG. 11 illustrates a stereo projection system with a semitransmissive projection screen according to one embodiment of the present invention.

FIG. 11 shows a projection system comprising projection screen 111 and two projectors: 112' and 112". The projection screen 111 includes two polarizing means 115' and 115", situated from the opposite sides of projection screen 111 and semitransmissive layer 114. The polarizing means 115' and 115" have coinciding transmission axes.

The image is created by both projectors 112' and 112" which emit light 116' and 116", respectively, having the identical polarization state. The projection screen 111 and projector 112' are functioning as the front projection system. The projection screen 111 and the projector 112" are functioning as the rear projection system. One or both projectors 112' and 112" may create images discriminated with respect to color, intensity, etc.

Also illustrated in FIG. 11 are sources 113' and 113" of ambient light, which are also situated from the opposite sides of projection screen 111. Preferably, the ambient light sources irradiate light (116' and 116") having the second polarization state, which is perpendicular to transmission axes of the polarizing means 115' and 115", respectively.

Figure 12:
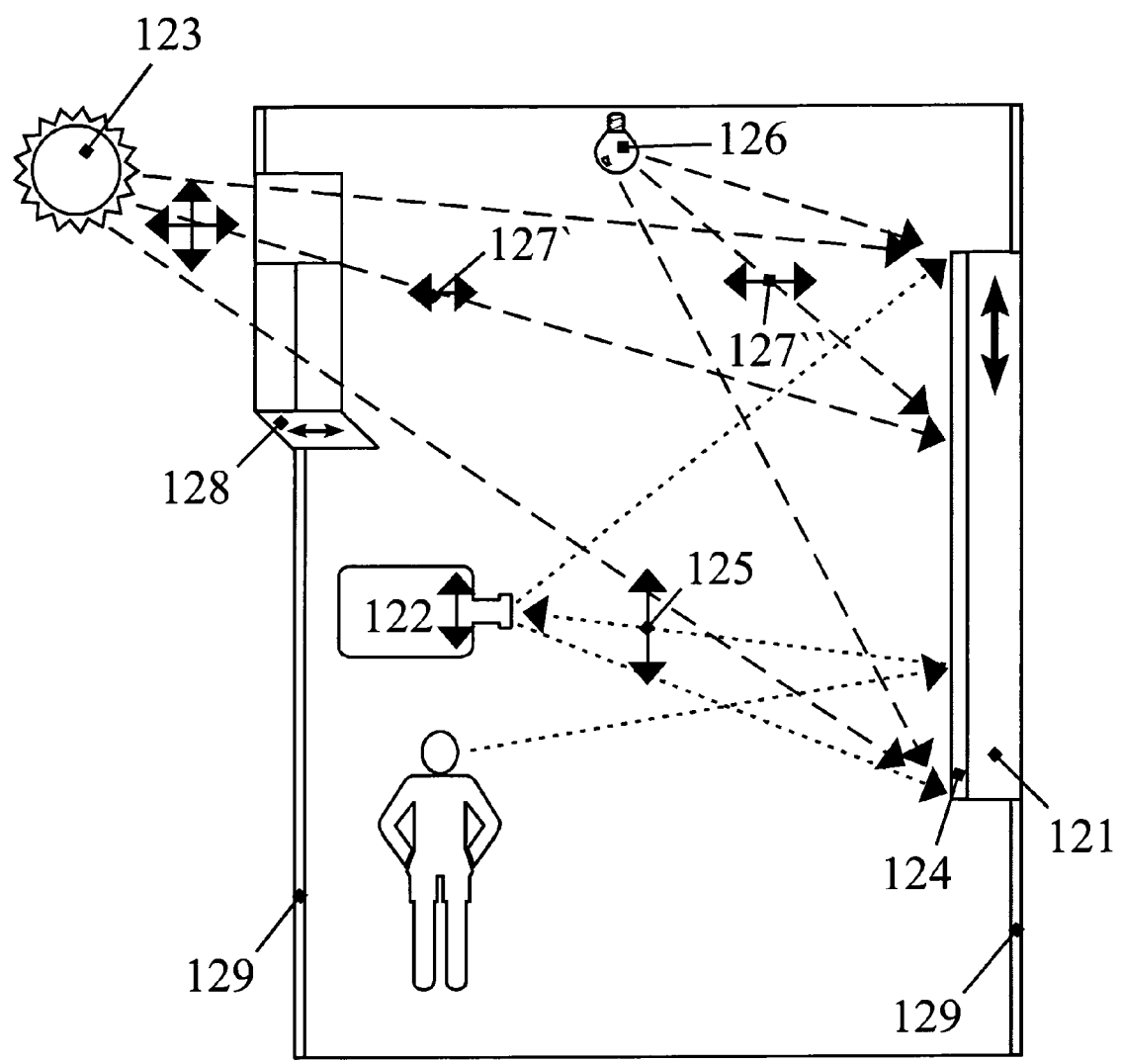
FIG. 12 illustrates a projection system with a front projection screen placed in a special demonstration room.

Projection systems are often used in areas with a relatively high level of ambient light. In such cases, it is preferred that the projection system be installed in a special room (FIG. 12). The projection system comprises a front projection screen 121 in combination with image projector 122. The sources of ambient light are room lamps 126 and ambient light source 123. The front projection screen 121 includes a polarizing means 124. The polarizing means 124 preferentially transmits light that has one (first) polarizing state 125 and absorbs light having a different (second) polarization state.

The projector 122 is capable of emitting polarized light toward screen 121 to form a reflected image thereon. The polarized light 125 produced by projector 122 is reflected from projection screen 121.

Preferably, lamps 126 emit light 127" having the second polarization state, which is perpendicular to the transmission axis of the polarizing means 124. The ambient light source 123 can be the sun, in which case windows in the room have the special ambient light polarizing means 128. The ambient light polarizing means transmit light 127' having the second polarization state, which is perpendicular to the transmission axis of the polarizing means 124. In addition, the walls of this room can have a special coating 129 capable of eliminating flashes.

EXAMPLE

The polarizing means placed onto the projection screen is based on a film formed by rodlike supramolecules including several polycyclic organic compounds with conjugated π-systems. Supramolecular materials utilized in TCF manufacturing are based on a mixture of water-soluble products of sulfonation of indanthrone and dibenzimidazole derivatives of perylenetetracarboxylic and naphthalenetetracarboxylic acids (named N-015™-Optiva Inc.).

The anisotropic crystalline layer (TCF) is about 100 nm thick with refractive indices $n_o$=1.5 and $n_e$=2.1 for the ordinary and extraordinary rays, respectively; it has a transmission of T=40%; a contrast ratio of CR=160; a polarization efficiency of $E_p$=99.4%; and the color coordinates for single polarizer a=−2.4, b=2.8.

Figure 13A:
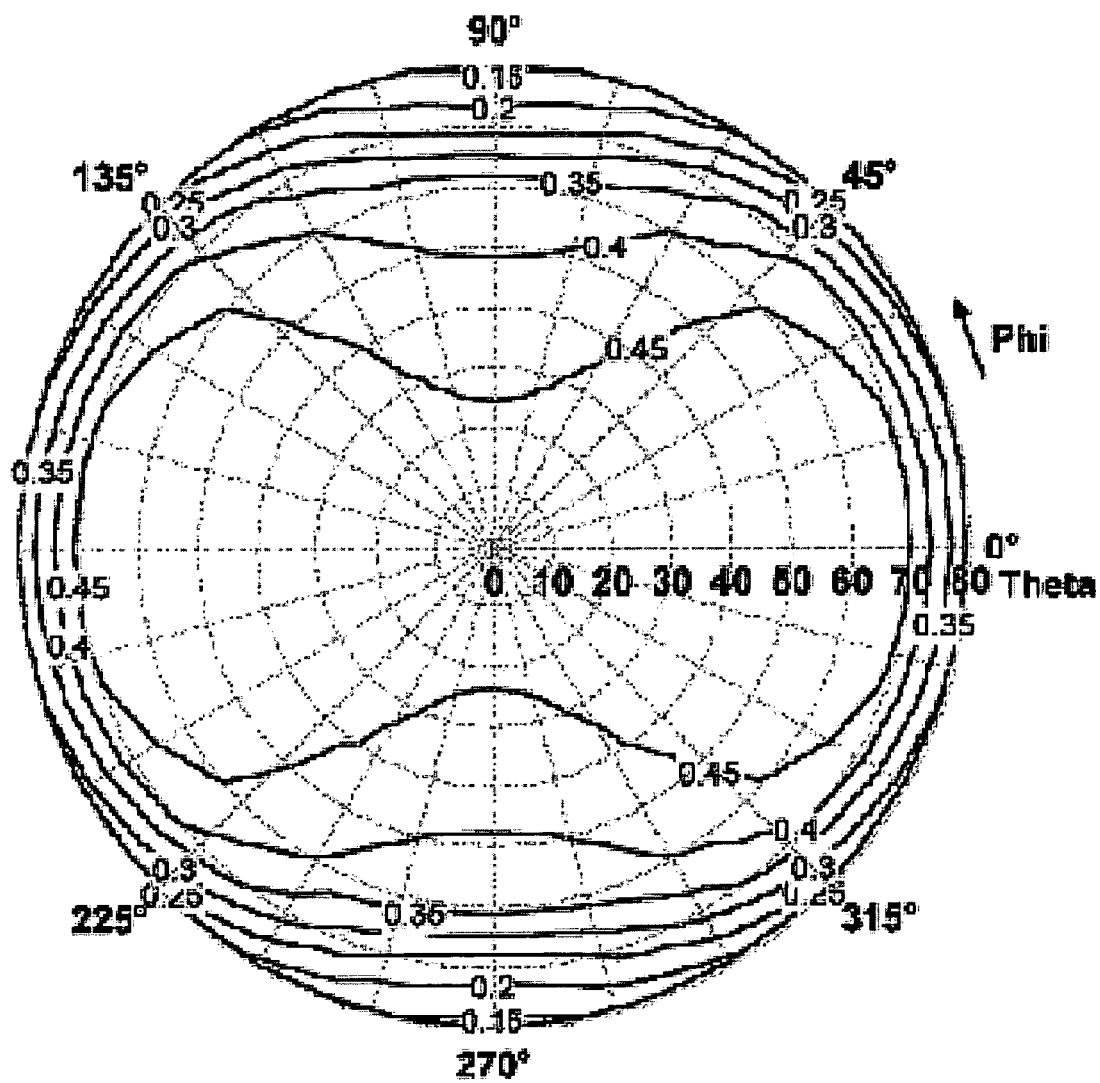
FIG. 13 presents contour plots of viewing angle transmittance of (a) a film formed by supramolecules and (b) a conventional O-type polarizer.
Figure 13B:
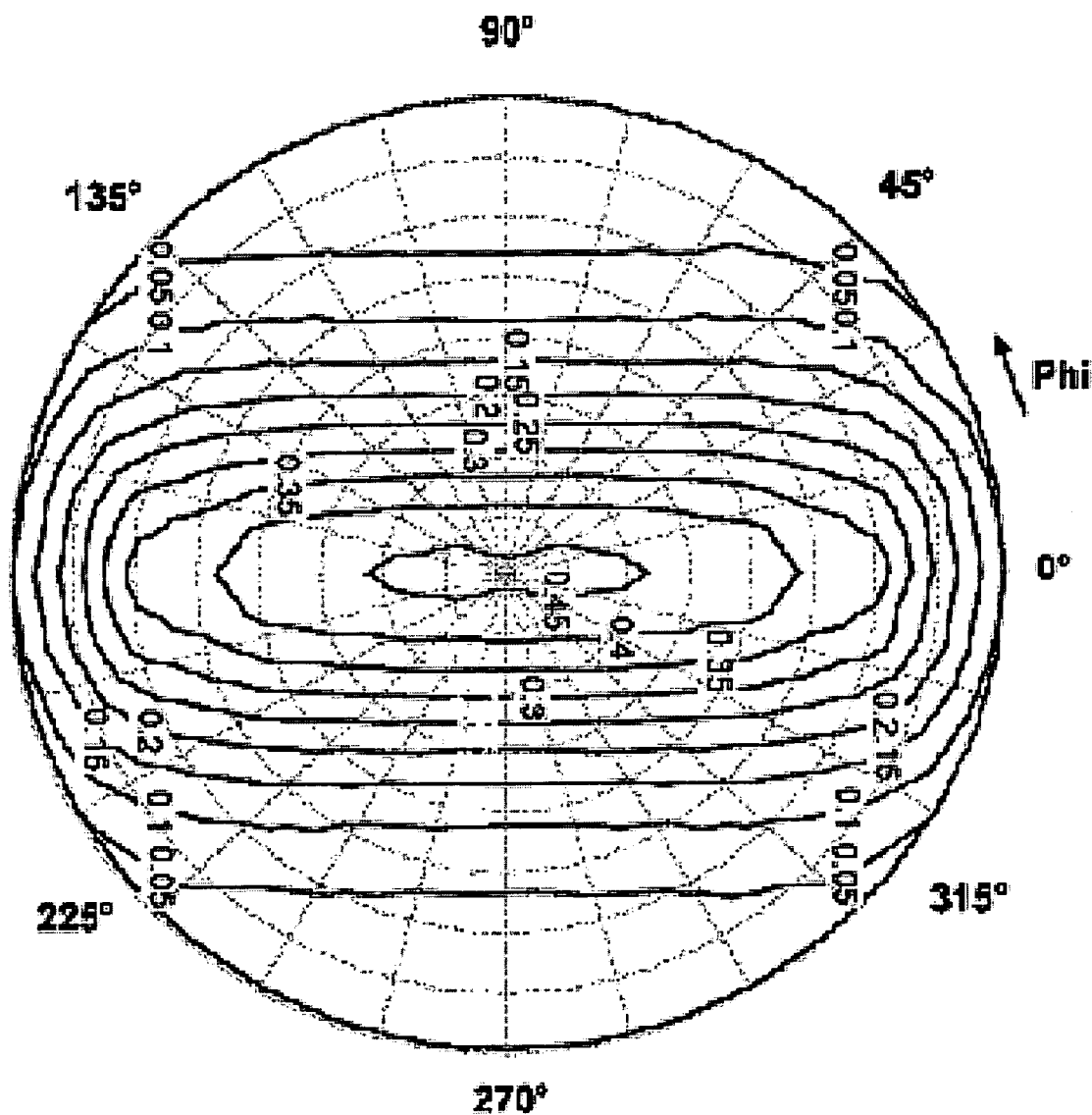

TCFs have two absorption axes and, therefore, their viewing angle characteristics differ from those of the conventional polarizers having only one absorption axis. Moreover, a high anisotropy of the angular transmittance of E-type polarizers allows them to be used for screen applications. Viewing angle characteristics of a screen covered by the ideal uniaxial E-type polarizer and the ideal O-type polarizer are shown in FIGS. 13a and 13b, respectively. The vertical direction of the screen is parallel to the transmission direction of the polarizers. The 40% transmittance iso-line aspect ratio is about 1.4 for the O-type polarizer and about 4 for the E-type polarizer. Therefore, unpolarized ambient light coming from top or bottom of the screen will be substantially absorbed by the E-type polarizer. In the case of vertically polarized light incident perpendicularly to the screen, the absorption will be about two times smaller. Thus, such a screen can be used with a projector emitting vertically polarized light.

Figure 14:
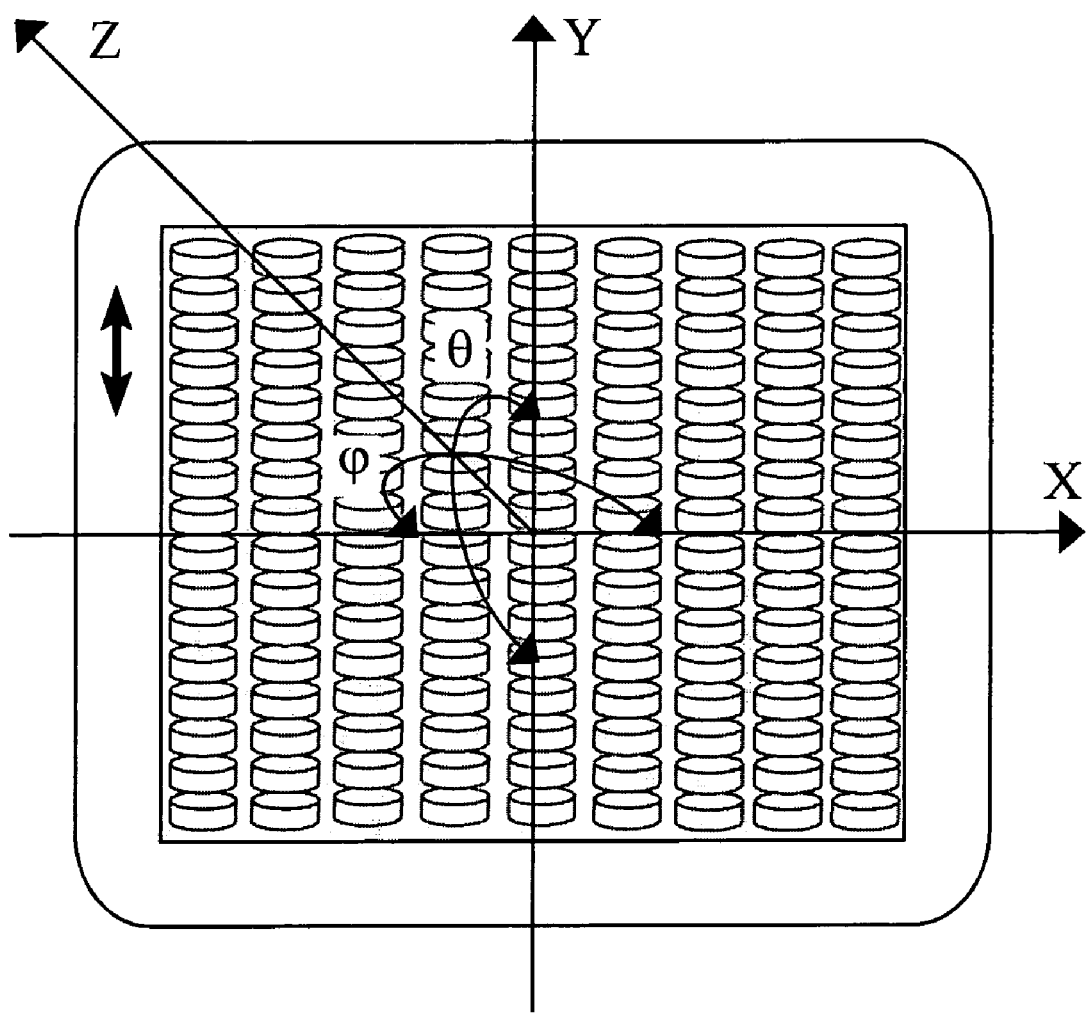
FIG. 14 shows a projection screen with vertical polarization of the output light according to one embodiment of the present invention.

FIG. 14 shows a projection screen for the light of vertical polarization, where Z is the axis perpendicular to the screen and Y is the vertical axis parallel to the transmission direction of the polarizer. The angles $\phi$ and $\theta$ are measured from the vertical axis Z. FIG. 13a shows the results of calculation for a uniaxial TCF N-015 with a double thickness of 600 nm. The screen has a good horizontal visibility in the interval (−45°, +45°). For oblique incidence, even at 20° relative to the vertical axis, the transmittance for ambient light drops to about a half.

Measurements of the screen characteristics were performed using a Spectra-Pritchart Photometer. The results of these measurements are listed in Table 1. In unpolarized ambient light, the screen contrast is increased due to the polarizer. In the dark (low ambient light) the polarizer has no visible defects of the screen performance. The advantages of polarized screens are obvious when they are used with polarized projectors.

TABLE 1

The results of contrast measurements

| Contrast | Light on (150 Lux) | Light off (20 Lux) |
|---|---|---|
| With polarizer | 7.5 | 15.3 |
| Without polarizer | 4.0 | 18.5 |

The foregoing descriptions of specific embodiments of the invention have been presented for the purpose of illustration and description. They are not intended to be exhaustive or to limit the invention to the precise forms disclosed, and obviously many modifications, embodiments, and variations are possible in light of the above teaching. It is intended that the scope of the invention be defined by the claims appended hereto and their equivalents.

What is claimed is:

1. A projection system comprising:
a projector for producing a polarized light for projecting an image, said polarized light having a first polarization plane; and
a projection screen on which the image projected by the projector is visualized, said projection screen comprising a substrate, a light scattering element, planarization layer and polarizing means, formed in this order without other layer between the layers, said polarizing means having a second polarization plane,
wherein the first polarization plane of the polarized light and the second polarization plane of the polarizing means are parallel, and the polarizing means comprises a film formed by rodlike supramolecules including at least one polycyclic organic compound with conjugated π-systems.

2. The projection system according to claim 1, wherein said aspect ratio is not less than 3.6.

3. The projection system according to claim 1, wherein said first and second polarization planes are vertical.

4. The projection system according to any of claims 1 to 3, wherein said projection screen is a front projection screen.

5. The projection system according to claim 1, further comprising at least one ambient polarized light source, wherein the ambient light has a polarization plane perpendicular to the second polarization plane of the polarizing means.

6. The projection system according to claim 1, further comprising at least one ambient light polarizing means, wherein the ambient light polarizing means has a transmission axis perpendicular to the second polarization plane of the polarizing means.

7. The projection system according to claim 1, further comprising an anti-reflective or anti-glare coating situated on a viewing side of the projection screen.

8. The projection system according to claim 1, wherein said film has a crystalline structure.

9. The projection system to claim 8, wherein said film has structure with an interplanar distance of 3.4±0.3 Å along the transmission axis.

10. The projection system according to claim 1, wherein said organic compound contains heterocycles.

11. The projection system according to claim 1, wherein said film is formed from a lyotropic liquid crystal.

12. The projection system according to claim 1, wherein the polarizing means is of a neutral color.

13. The projection system according to claim 1, wherein the polarizing means transmits more than 80% of the polarized light in the polarization plane.

14. The projection system according to claim 13, wherein the polarizing means transmits more than 90% of the polarized light in the polarization plane.

15. The projection system according to claim 1, wherein the polarizing means has a dichroic ratio greater than 20.

16. The projection system according to claim 1, wherein said projection screen is a semitransmissive projection screen.

17. The projection system according to claim 16, further comprising a one-side Fresnel layer.

18. The projection system according to claim 17, wherein said one-side Fresnel layer comprises:
a matrix,
a plurality of particles embedded within the matrix,
wherein said particles have a refractive index different from that of the matrix, and a Fresnel structure formed on one side of the Fresnel layer.

19. The projection system according to claim 17, further comprising at least one lenticular lens sheet having a vertical orientation.

20. The projection system according to claim 19, wherein the projection screen further comprises a black stripe.

21. The projection system according to claim 20 wherein the black stripe comprises a polarizing material formed by rodlike supramolecules comprising at least one polycyclic organic compound with conjugated π-systems.

22. The projection system according to claim 17, wherein the projection screen further comprises a cross-lenticular lens sheet.

23. The projection system according to claim 1, wherein the polarized light for projecting an image consists of at least three base colors.

24. The projection system according to claim 23, wherein the projector further comprises at least one polarized rotator to rotate polarization of at least one color to predetermined direction.

25. The projection system according to claim 1, wherein the light scattering element is a diffusive reflective layer.

26. The projection system according to claim 1, wherein the light scattering element is a diffuse scattering layer.

27. A projection screen comprising a substrate, a light scattering element, planarization layer and a polarizing means formed in this order without other layer between the layers,
wherein the polarizing means comprises a film formed by rodlike supramolecules comprising at least one polycyclic organic compound with conjugated π-systems.

28. The projection screen according to claim 27, wherein said aspect ratio is not less than 3.6.

29. The projection screen according to claim 27, further comprising an anti-reflective or anti-glare coating.

30. The projection screen to claim 29, wherein said film has structure with an interplanar distance of 3.4±0.3 Å along the transmission axis.

31. The projection screen according to claim 27, wherein said film has a crystalline structure.

32. The projection screen according to claim 27, wherein said organic compound contains heterocycles.

33. The projection screen according to claim 27, wherein said film is formed from a lyotropic liquid crystal.

34. The projection screen according to claim 27, further comprising a one-side Fresnel layer.

35. The projection screen according to claim 34, wherein said one-side Fresnel layer comprises:
a matrix, and
a plurality of particles embedded within the matrix,
wherein said particles have a refractive index different from that of the matrix, and a Fresnel structure formed on one side of the Fresnel layer.

36. The projection screen according to claim 34, further comprising at least one lenticular lens sheet having a vertical orientation.

37. The projection screen according to claim 36, further comprising a black stripe.

38. The projection screen according to claim 37, wherein the black stripe comprises polarizing material formed by rodlike supramolecules comprising at least one polycyclic organic compound with conjugated π-systems.

39. The projection screen according to claim 34, further comprising a cross-lenticular lens sheet.

40. The projection screen according to claim 27, wherein the light scattering element is a diffusive reflective layer.

41. The projection screen according to claim 27, wherein the light scattering element is a diffuse scattering layer.

* * * * *